UNITED STATES PATENT OFFICE.

CHARLES RANSON, OF PARIS, FRANCE.

METHOD OF MANUFACTURING DEHYDRATED ZINC SULFID.

1,171,246.      Specification of Letters Patent.     Patented Feb. 8, 1916.

No Drawing.     Application filed September 6, 1910. Serial No. 580,541.

*To all whom it may concern:*

Be it known that I, CHARLES RANSON, of 2 Rue Poncelet, Paris, France, engineer, have invented a new and useful Improvement in the Method of Manufacturing Dehydrated Zinc Sulfid, which improvement is fully set forth in the following specification.

Zinc sulfid obtained by the reaction of soluble sulfids of the metals of the alkalis or alkaline earths upon solution of zincates of the alkalis or alkaline earths is a hydrated product which becomes anhydrous only at temperatures exceeding 250° C. At this temperature, however, it assumes a yellow coloration which remains after cooling, whereby its employment as a white paint is prejudicially affected. On the other hand hydrated zinc sulfid oxidizes in the air somewhat readily and paints prepared with this product are deficient in their resistance to atmospheric influences in proportion to the amount of water the zinc sulfid contains, from which it follows that the zinc sulfid must be dehydrated as much as possible if it is to be successfully used as paint.

It has been found that the yellow coloration of sulfid of zinc heated above 250° C. is due to the presence of a certain quantity of zinc oxid contained in the zinc sulfid precipitated by the stated sulfids from solutions of zincates of alkalis or alkaline earths, and that this zinc oxid is chemically combined with the zinc sulfid as it is insoluble in dilute acetic acid, while free zinc oxid readily dissolves therein. It has also been found that a product is obtained which can be completely dehydrated without becoming yellow on heating, if the chemically combined zinc oxid is converted into zinc sulfid.

The processes heretofore known for converting zinc oxid into zinc sulfid have not given a thoroughly satisfactory result in the present case. Thus, for example, solutions of the stated sulfids convert only a small part of the zinc oxid into zinc sulfid, even after a lengthy boiling. On the other hand, the conversion is effected in the presence of a small excess of ammonium sulfhydrate by heating under pressure to about 155° C. In the presence of a certain quantity of hydrofluoric acid the chemically combined zinc oxid is converted into zinc sulfid to such an extent that upon heating to a red heat, the resultant product no longer becomes yellow. Finally, it is found that the conversion can be effected by calcining the zinc-oxy-sulfid with a certain quantity of sulfur in the presence of alkali or alkaline earth fluo-silicates which apparently act as facilitating agents. The hydrofluoric acid can be replaced by hydrochloric acid, but the product so obtained becomes black in sunlight unless it be subjected to a further treatment which consists in eliminating the zinc chlorid by alkalis or alkaline earths.

The process can be carried into practice in the following manner:

1°. 100 kilos of zinc oxy-sulfid precipitated from an alkaline solution, filtered and washed are stirred in about 50 liters of water, to which a quantity of hydrochloric acid or hydrofluoric acid (halogen acids), corresponding approximately to 3 to 4 liters of concentrated acid, is added. While agitating a current of sulfureted hydrogen is passed through until a drop of the mixture on paper impregnated with lead salt leaves a black stain. The product is then filtered, washed, dried and calcined at a temperature of from 600 to 700° C. while excluding the air.

2°. 100 kilos of zinc oxy-sulfid as above are mixed with about 5 kilos of sulfur and 1 to 2 kilos of sodium silico-fluorid or fluo-silicate. This mixture is calcined at a temperature of 600–700° C. while excluding the air.

The resultant product is freed from fluorin compounds by washing in warm water. If hydrochloric acid has been used, an alkali or alkaline earth must be added to the washing water for the purpose of eliminating the whole of the chlorin which is present for the most part as zinc chlorid.

Claims—

1. The process which comprises reacting upon a zincate with a soluble sulfid to produce zinc oxysulfid as a precipitate, and then subjecting said precipitate in the presence of a fluosilicate to the action of a sulfur containing reagent capable of replacing the oxygen of the oxysulfid by sulfur.

2. The process which comprises reacting upon a zincate with a soluble sulfid to produce zinc oxysulfid as a precipitate, then subjecting said precipitate in the presence of a fluosilicate to the action of a sulfur containing reagent capable of replacing the oxygen of the oxysulfid by sulfur, and then dehydrating the product.

3. The process of preparing pigments which comprises treating zinc sulfid containing zinc oxid with a sulfur-containing reagent in the presence of a halogen compound capable of facilitating the sulfurization of the same by the sulfur-containing reagent.

4. The process of preparing pigments which comprises treating zinc sulfid containing zinc oxid with a sulfur-containing reagent in the presence of a compound containing a halogen acid radical capable of facilitating the sulfurization of the same by the sulfur-containing reagent.

5. The process of preparing pigments which comprises treating zinc oxy-sulfid with a reagent containing sulfur in available form in the presence of a compound containing fluorin and capable of facilitating the sulfurization of the same by the sulfur containing reagent.

6. The process of preparing pigments, which comprises treating zinc oxysulfid with a reagent containing sulfur in available form in presence of a fluosilicate, whereby the oxysulfid is converted into the sulfid.

7. The process of preparing pigments which comprises treating zinc oxysulfid with a reagent containing sulfur in available form in the presence of sodium fluosilicate, whereby the oxysulfid is converted into the sulfid.

8. The process of preparing pigments which comprises heating a mixture comprising zinc oxysulfid, sulfur, and an alkali fluosilicate, to convert the oxysulfid into the sulfid.

9. The process of preparing pigments which comprises calcining a mixture comprising zinc oxysulfid, sulfur, and sodium fluosilicate, under exclusion of air, to convert the oxysulfid into sulfid, and freeing the resultant product of fluorin compounds.

10. The process of preparing pigments which comprises treating zinc sulfid containing zinc oxid with a reagent comprising available sulfur in the presence of an agent facilitating the conversion of such zinc oxid into zinc sulfid.

In testimony whereof I have signed this specification in the presence of two subscribing witnesses.

CHARLES RANSON.

Witnesses:
 DEAN B. MASON,
 J. COMBE.